(12) United States Patent
Turner et al.

(10) Patent No.: US 9,721,277 B2
(45) Date of Patent: Aug. 1, 2017

(54) SYSTEM AND METHODS FOR PROVIDING FINANCIAL ACCOUNT INFORMATION OVER A NETWORK

(71) Applicant: Capital One Financial Corporation, McLean, VA (US)

(72) Inventors: Jonathan Turner, Richmond, VA (US); Arthur Koeppel, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 1027 days.

(21) Appl. No.: 13/894,303

(22) Filed: May 14, 2013

(65) Prior Publication Data
US 2014/0156555 A1 Jun. 5, 2014

Related U.S. Application Data

(62) Division of application No. 11/634,288, filed on Dec. 6, 2006, now Pat. No. 8,442,872, which is a division
(Continued)

(51) Int. Cl.
*G06Q 30/00* (2012.01)
*G06Q 30/02* (2012.01)
(Continued)

(52) U.S. Cl.
CPC ......... *G06Q 30/0282* (2013.01); *G06Q 20/02* (2013.01); *G06Q 20/023* (2013.01);
(Continued)

(58) Field of Classification Search
USPC .................................................... 705/26, 27
(Continued)

(56) References Cited

U.S. PATENT DOCUMENTS 5,724,521 A 3/1998 Dedrick
5,883,810 A * 3/1999 Franklin ................ G06Q 20/02
235/379
(Continued)

FOREIGN PATENT DOCUMENTS

WO WO 00/73931 12/2000

OTHER PUBLICATIONS

WebAssured.com: Internet Archive Wayback Machine, www.archive.org; www.webassured.com; 2000, 29pgs.*
(Continued)

*Primary Examiner* — Rob Pond
(74) *Attorney, Agent, or Firm* — Finnegan, Henderson, Farabow, Garrett & Dunner LLP

(57) ABSTRACT

A system and method for providing financial account messages to customers while accessing web sites is disclosed. Methods, systems and articles of manufacture consistent with the present invention enable a financial account issuer to provide an application to customer's computer system over a network. The application may be configured to provide various messages associated with the customer's financial account provided by the financial account issuer while the customer browses web sites. The financial account messages may be configured to provide interactive and dynamically changing account status information based on attempted purchases of goods and/or services by the customer at merchants' web sites. The application may also be configured to provide rating information associated with web sites accessed by the customer.

18 Claims, 9 Drawing Sheets

Related U.S. Application Data of application No. 09/924,684, filed on Aug. 9, 2001, now Pat. No. 7,505,925.

(51) Int. Cl.

| | | |
|---|---|---|
| *G06Q 20/02* | (2012.01) | |
| *G06Q 20/04* | (2012.01) | |
| *G06Q 20/10* | (2012.01) | |
| *G06Q 30/06* | (2012.01) | |
| *G06Q 40/00* | (2012.01) | |
| *G06Q 40/02* | (2012.01) | |
| *G06Q 40/06* | (2012.01) | |
| *G07F 19/00* | (2006.01) | |

(52) U.S. Cl.
CPC ............ *G06Q 20/04* (2013.01); *G06Q 20/10* (2013.01); *G06Q 30/02* (2013.01); *G06Q 30/0239* (2013.01); *G06Q 30/0601* (2013.01); *G06Q 30/0621* (2013.01); *G06Q 30/0629* (2013.01); *G06Q 30/0641* (2013.01); *G06Q 40/00* (2013.01); *G06Q 40/02* (2013.01); *G06Q 40/06* (2013.01); *G07F 19/20* (2013.01); *G07F 19/203* (2013.01)

(58) Field of Classification Search
IPC .......................................... G06Q 30/00,30/0631
See application file for complete search history.

(56) References Cited

U.S. PATENT DOCUMENTS

| | | | |
|---|---|---|---|
| 5,913,040 A | 6/1999 | Rakavy et al. | |
| 6,014,502 A | 1/2000 | Moraes | |
| 6,032,134 A | 2/2000 | Weissman | |
| 6,032,136 A | 2/2000 | Brake, Jr. et al. | |
| 6,044,360 A | 3/2000 | Picciallo | |
| 6,076,070 A | 6/2000 | Stack | |
| 6,157,946 A | 12/2000 | Itakura et al. | |
| 6,173,269 B1 | 1/2001 | Solokl et al. | |
| 6,324,524 B1 | 11/2001 | Lent et al. | |
| 6,539,392 B1* | 3/2003 | Rebane .................. | G06Q 30/02 705/26.1 |
| 6,764,001 B1 | 7/2004 | Kawai et al. | |
| 6,868,395 B1 | 3/2005 | Szlam et al. | |
| 6,873,968 B2 | 3/2005 | Ehrlich et al. | |
| 6,912,507 B1 | 6/2005 | Phillips et al. | |
| 6,915,277 B1 | 7/2005 | Manchester et al. | |
| 7,099,833 B1 | 8/2006 | Sundaresan | |
| 7,127,414 B1 | 10/2006 | Awadallah et al. | |
| 2001/0044762 A1 | 11/2001 | Nault | |
| 2001/0051920 A1 | 12/2001 | Joao et al. | |
| 2002/0046203 A1* | 4/2002 | Siegel ................ | G06F 17/30867 |
| 2002/0052788 A1 | 5/2002 | Perkes et al. | |
| 2002/0062279 A1 | 5/2002 | Behrenbrinker et al. | |
| 2002/0087467 A1 | 7/2002 | Mascavage et al. | |
| 2002/0116304 A1 | 8/2002 | Casper et al. | |
| 2002/0138418 A1 | 9/2002 | Zarin et al. | |
| 2002/0152135 A1 | 10/2002 | Beeri et al. | |
| 2002/0152160 A1 | 10/2002 | Allen-Rouman et al. | |
| 2002/0156723 A1 | 10/2002 | Lilly et al. | |
| 2002/0174030 A1 | 11/2002 | Praisner et al. | |
| 2003/0004866 A1 | 1/2003 | Huennekens et al. | |
| 2003/0004868 A1 | 1/2003 | Early et al. | |
| 2003/0009393 A1 | 1/2003 | Norris | |
| 2003/0040976 A1 | 2/2003 | Adler et al. | |
| 2003/0046222 A1 | 3/2003 | Bard et al. | |
| 2003/0050851 A1 | 3/2003 | Vaccaro | |
| 2003/0097270 A1 | 5/2003 | Musselwhite et al. | |
| 2003/0204470 A1 | 10/2003 | Manchester et al. | |
| 2004/0117300 A1 | 6/2004 | Jones et al. | |
| 2004/0254848 A1 | 12/2004 | Golan et al. | |
| 2006/0143121 A1 | 6/2006 | Treider et al. | |
| 2007/0078759 A1 | 4/2007 | Lilly et al. | |

OTHER PUBLICATIONS

Bielski, Lauren: "Making the Customer Relationship Work," ABA Banking Journal, Mar. 2001, v93l3; ProQuest Dialog #72301651, 6pgs.*

Mendelson, Edward: "iChoose," PC Magazine Oct. 17, 2000, v19i18; ProQuest Dialog #77371878, 3pgs.*

"Bankers urged to monitor card portfolios as bankruptcies rise," ABA Retail Banker International, v47, pp. 2-3, Jan. 1987.

Consumer Reports: "Better Ways to Buy," Jul. 2000; Proquest #269130011, 3 pgs.

"Cowbranded Card," Card Fax, v96, n205, p. 1, Nov. 14, 1996.

"Dean Witter Ups the Ante With a Two-Tier Credit Line," Credit Card News, Sep. 15, 1995.

"Dean Witter's New Family Plan," Credit Card Management, v9, n2, pp. 64+, May 1996.

"Delta Will Fly its Cobranded Cards to More Countries," Card Fax, Feb. 6, 2001.

"Education A Perk in New AT&T College Credit Card Offer," Card News, v8, n16, Aug. 23, 1993.

Lucas, "Discover's new chemistry," Credit Card Management, v8, n12, pp. 50-56, Mar. 1996.

Lucas, "Store card software gets dressed up," Credit Card Management, v8, n6, pp. 90-93, Sep. 1995.

Mack, Ann, "Choose Me," Adweek Apr. 10, 2000; Proquest #52699153, 3 pgs.

Marshall, "Zap—The Computer Lops Off Another Bad Risk," United States Banker, v102, n8, p. 49-50, Aug. 1992.

PCT International Search Report, International Publication No. WO 02/685235 A3, Aug. 22, 2002 (3 pgs.).

Punch, "Santa Claus comes to retail cobranding," Credit Card Management, v15, n10, pp. 24-30, Dec. 2002.

"Retail Cards SPS Finds the Skies to be Friendly With United's Private-Label Card," Credit Card News, Jul. 1, 1994.

"Sears Tests Starter Card," Card Fax, v1997, n21, p. 1, Jan. 28, 1997.

* cited by examiner

SYSTEM AND METHODS FOR PROVIDING FINANCIAL ACCOUNT INFORMATION OVER A NETWORK

This is a divisional of U.S. patent application Ser. No. 11/634,288 filed on Dec. 6, 2006, which is a divisional of U.S. patent application Ser. No. 09/924,684, filed Aug. 9, 2001, now U.S. Pat. No. 7,505,925, which are both incorporated herein by reference in their entirety.

DESCRIPTION OF THE INVENTION

Field of the Invention

This invention relates to on-line financial account presentation systems. More particularly, the invention relates to systems and methods for electronically providing financial account information to a client system while the client system accesses a web server over a network.

Background of the Invention

On-line advertising and content provision has grown tremendously since the inception of the Internet and on-line services. Users can access a wide variety of information associated with their interests by using the Internet and accessing Web sites generated by providers. A computer equipped with a program called a browser, such as Netscape Navigator from Netscape Corporation, makes it a simple task to traverse the vast network of information available on the Internet and, specifically, its subpart known as the "World Wide Web."

The architecture of the Web follows a conventional client-server model. The tell is "client" and "server" are used to refer to a computer's general role as a requester of data (the client) or provider of data (the server). Under the Web environment, Web browsers reside in clients and specially formatted "Web documents" reside on Internet (Web) servers. Web clients and Web servers communicate using a protocol called "HyperText Transfer Protocol" (HTTP).

In operation, a browser opens a connection to a server and initiates a request for a document or a Web page including content. The server delivers the requested document or Web page, typically in the form coded in a standard "HyperText Markup Language" (HTML) format. After the document or Web page is delivered, the connection is closed and the browser displays the document or Web page to the user.

The Internet consists of a worldwide computer network that communicates using well defined protocol known as the Internet Protocol (IP). Computer systems and servers that are directly connected to the Internet each have an unique address consisting of four numbers separated by periods such as "123.456.0.3". To simplify Internet addressing, a "Domain Name System" was created that allows users to access Internet resources with a simpler alphanumeric naming system. For example, the name "capitalone.com" is the name for a computer system or Web server operated by Capital One®.

To further define the addresses of resources on the Internet, a Uniform Resource Locator system was created that uses a Uniform Resource Locator (URL) as a descriptor that specifically defines a type of Internet resource and its location. URLs have the following format: "resource-type:// domain.address/path-name." The "resource-type" defines the type of Internet resource. Web documents, for example, are identified by the resource type "http", which indicates the protocol used to access the document.

To access a document on the Web, the user enters a URL for the Web document into a browser program executing on a client system with a connection to the Internet. The Web browser then sends a request in accordance with the HTTP protocol to the Web server that has the Web document using the URL. The Web server responds to the request by transmitting the requested object to the client. In most cases, the object is a plain text document containing text (in ASCII) that is written in HTML. Such objects often contain hyperlinks to other Web documents. The Web browser displays the HTML document on the screen for the user and the hyperlinks to other Web documents are emphasized in some fashion such that the user can select the hyperlink.

In some instances, the HTML document may contain data from more than one server. For example, remote text and images may be retrieved from remote servers and integrated into a Web document by a client system. One server may provide an image file, while another server may provide text information to the client system over a network such as the Internet. Different techniques are available to display these types of composite Web documents. For example, a program called a servlet executing on one Of the servers may combine data from the various servers referenced in a selected Web document and transmit the composite Web document to the client. In other configurations, the client may utilize a program called an applet, which may be transmitted to the client from one of the servers, to access the multiple servers offering parts of the composite and to build the composite Web document.

Generally, users view the content delivered in the Web pages and may select hyperlinks to other sub pages of a Web site, or to entirely different Web sites. Providers associate the users "browsing" these Web pages as potential consumers for the products and services they provide. By simply providing a Web server having information on a providers' product and/or service offerings and a customer database, and linking the Web server to the Web, providers may track user interactions with the Web server including visits, sales, buying trends and product/service preferences—all at the user level. Providers may then present or offer its customers with products and services they are most likely to buy—on an individual basis. For this reason alone, most marketing professionals consider the Web to be one of the best direct marketing tools. In order to gain new or retain existing customers, providers need to ensure they present products and services that potential consumers are interested in. Accordingly, the importance of target advertising and target content provision has become an important role in the way providers conduct business over the Internet.

One conventional technique associated with target advertising is the use of advertising banners presented on existing Web pages generated by providers. When a user accesses a Web page associated with a provider, using a Web browser such as Netscape Navigator or Microsoft Internet Explorer, a banner advertising the provider's products or services appears on the Web page. This banner may be presented by the Web page's provider, or may be provided by a third party advertisement server. When an interested user selects the advertisement (by "clicking through" on the banner) the user is generally forwarded to another Web page or site associated with the advertisement. This page or site may be the third party advertiser's home page. The success of the advertisement is based upon the user's response, in this case, the user "clicking through" the advertisement or banner, to receive more information on the content advertised.

Another electronic advertising method employed is the local storing of advertisements on a user's local computer system, as disclosed in U.S. Pat. No. 5,913,040, entitled "METHOD AND APPARATUS FOR TRANSMITTING AND DISPLAYING INFORMATION BETWEEN A REMOTE NETWORK AND A LOCAL COMPUTER," and expressly incorporated herein by reference in its entirety. The method and system disclosed by U.S. Pat. No. 5,913,040 not only allows advertisements to be displayed while a user reviews a web page, but the advertisements may also be presented when the user is not on-line and accessing a web site. Also, the user may select categories of advertisements to be displayed. The advertisements are transparently downloaded from a network server to a user's local computer system by a monitoring the traffic on a communications link associated with the user's computer system. When the utilization rate of the communications link is low, the network server "politely" pushes small portions of the advertisements to the user's computer system.

Although the system and method disclosed by the U.S. Pat. No. 5,913,040 may better target customers for advertisements than conventional systems by employing user controlled profiles, the advertisements themselves are generally statically designed, and merely present information describing goods and/or services the user's may or may not already have obtained.

SUMMARY OF THE INVENTION

It is therefore desirable to have a method and system that enables a network server to target potential customers for advertising when they are at the point of purchase at another web site, and dynamically providing interactive information associated with a good and/or service that is presented as content rendered on the customer's display.

Methods, systems and articles of manufacture consistent with the present invention enable a client system to receive an application from a network server (maintained by a credit issuer) that identifies a particular web site accessed by the client system through a network, such as the Internet. The application may be configured to determine whether the accessed web site is included in a list of web sites created by the network server, and if so provides a message on top of a web browser window. The messages may be displayed as banner type windows, as rolling ticker messages that scroll across a portion of the viewing area of the display device, or as a separate pop-up window. In one aspect of the invention, the message may include information reflecting discounts for a particular item offered by the accessed web site, if the user uses a financial account, such as a credit account, provided by the credit issuer to purchase the items. Alternatively, the message may include a message that indicates a discount if the user purchases the particular item at an alternate web site using the credit account.

Additionally, methods, systems and articles of manufacture enable the application to access status information associated with the credit account. The status information may be used to generate a message that indicates selected information associated with the credit account on top of a web browser window rendered at the client system. The information may include, for example, a current credit limit, outstanding balance, payment data, and finance fees associated with the credit account. Furthermore, in one aspect of the invention, the information may be associated with a good and/or service a customer is attempting to purchase at the web site. The information may be dynamically adjusted to present how the purchase of the good and/or service may affect the credit account. For instance, the message may present information reflecting a new outstanding balance and finance charges associated with the credit account if used to purchase the good and/or service. In another aspect of the invention, the message may include an indication that the credit limit associated with the credit account will be exceeded if the good and/or service is purchased by the user using the credit account. And, in addition to the credit limit indication, the message may include an offer to increase the credit limit if the good and/or service is purchased using the credit account.

Also, methods, systems and articles of manufacturer consistent with features and principles of the present invention may configure the application to present an interactive message associated with a credit account corresponding to a user accessing a web site. The interactive message may allow a user to determine how long it would take to pay off the amount associated with a particular good and/or service purchased from the web site using the credit account. Alternatively, the interactive message may allow a user to determine the amount of payments would need to be made to the credit issuer for a selected length of time to pay off the amount associated with a particular good and/or service purchased from the web site using the credit account.

Additionally, methods, systems and articles of manufacturer consistent with features and principles of the present invention may provide a message including a rating of a particular web site accessed by the client system. The rating may be associated with fraudulent activities corresponding to the web site. Furthermore, the message may allow a user to provide a personal rating value associated with the accessed web site that may be used by the network server to update the rating associated with the accessed web site.

Furthermore, methods, systems and articles of manufacturer consistent with features and principles of the present invention may present a message including information associated with alternate web sites that offer a particular good and/or service that a user is attempting to purchase at a currently accessed web site.

Accordingly, methods, systems, and articles of manufacturer, enable a credit issuer to provide dynamic and interactive messages to its customers while they access web sites to possible purchase goods and/or services electronically. The messages may be customized by the customers to allow them to view information associated with credit accounts provided by the credit issuer. Additionally, the credit issuer may provide discounts to the customers for purchasing goods and/or services at a currently accessed web site, or at alternate web sites.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Figure 1:
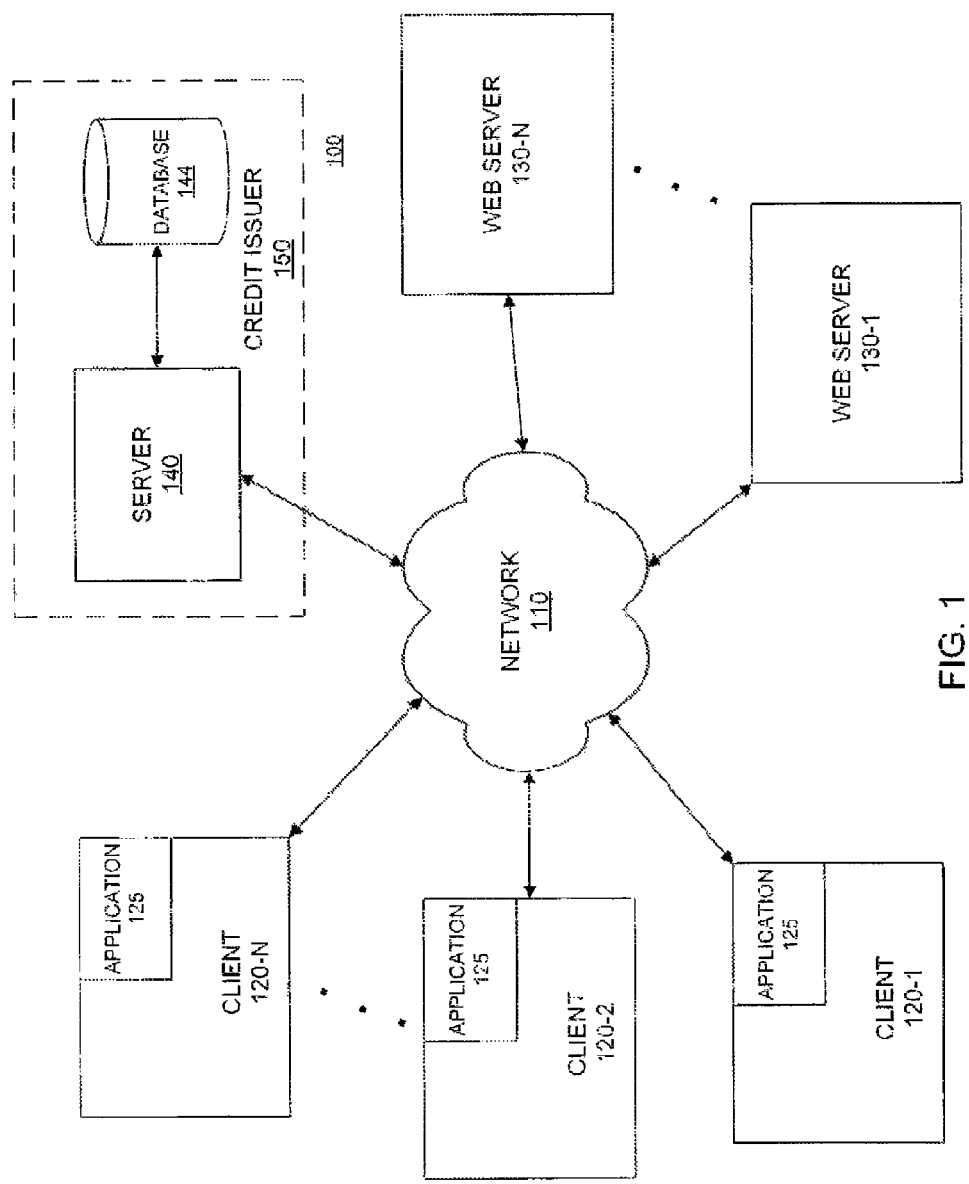
FIG. 1 illustrates an exemplary block diagram of an environment from which methods and systems consistent with features and principles of the present invention may be implemented.

Methods, systems, and articles of manufacture consistent with the present invention enable a credit issuer to provide messages to customers associated with a credit account provided by the credit issuer. The credit issuer provides a software application to a client system operated by the customer over a network, such as the Internet. The application may be configured to determine when the customer has accessed a web site and determine a type of message to display on top of a web browser window. The criteria may include, but is not limited to, whether the customer is attempting purchase a good and/or service from the web site, the current status of the credit account associated with the customer, whether the web site is included in a list of web sites maintained by the credit issuer, and whether the web site is included in a web site rating table maintained by the credit issuer.

The types of messages that may be displayed vary according to the above described criteria, as well as customer defined options that are offered by the credit issuer. The messages that may be created by methods and systems consistent with features of the present invention include, but are not limited to: (1) current account status information associated with a credit account corresponding to a customer attempting to purchase a good and/or service at a web site; (2) dynamic account status information reflecting potential changes to the credit account that may occur if the customer purchases the good and/or service; (3) offers to extend a credit limit associated with the credit account when the credit limit would be exceeded if the customer purchased the good and/or service; (4) alternate web sites that offer the good and/or service, possibly at a cheaper price; and (5) an interactive message that allows a customer to selectively determine changes to the status of the credit account based on the price of the good and/or service. Additionally, the messages may include a ranking value associated with an accessed web site that may reflect a determined category rank established by the credit issuer.

Therefore, as described above, and explained in further detail below, methods and systems consistent with features and principles of the present invention dynamically provide information associated with a credit account to customers while they access web sites. The information may be presented as messages on top of a web browser window that displays a web page at a computer system used by the customer. Accordingly, customers may receive useful credit account information and messages as they browse web sites, and possible attempt to purchase goods and/or services from these sites.

Reference will now be made in detail to the exemplary embodiments of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

FIG. 1 illustrates an exemplary system environment 100 in which the features and principles of the invention may be implemented. As illustrated in FIG. 1, the system environment 100 may include a network 110, client systems 120-1 to 120-N, web servers 130-1 to 130-N, network server 140 and database 144, both of which may be associated with a credit issuer 150. Also, included within each client system 120-1 to 120-N, may be an application 125.

Network 110 interconnects client systems 110-1 to 110-N, web servers 130-1 to 130-N, and network server 140. Network 110 may include one or more communication networks, including the Internet or any other similar network that supports Web-based processing. Client systems 120-1 to 120-N may connect to network 140 through any suitable wired or wireless supported connection.

Client systems 120-1 to 120-N may include a desktop computer, workstation, laptop, personal digital assistant or any other similar client side system known in the art. For example, client systems 120-1 to 120-N may include a processor, associated memory, and numerous other elements and functionalities typical in today's computer systems. These elements may include input means such as a keyboard and a mouse, although in an accessible environment these input means may take other forms. Also included with each client system 120-1 to 120-N may be an output device such as a display, which may also take a different form in an accessible environment. Client systems 120-1 to 120-N may be equipped with browser software such as Netscape Navigator, Microsoft Internet Explorer, or any other known browser software. In one aspect of the invention, client systems 120-1 to 120-N may be associated with customers of credit issuer 150 that provides credit accounts used by the customers. These customers may use a client system 120-1 to 120-N to connect to network 110 and gain access to web pages provide by web servers 130-1 to 130-N. Furthermore, client systems 120-1 to 120-N may communicate with network server 140 through network 110.

Application 125 may be software that is provided by network server 140 (or credit card issuer 150) and performs functions consistent with features and principles of the present invention. Application 125 may be stored in any memory device contained in or associated with client system 120-1 to 120-N, such as a hard drive or local memory that may consist of, but is not limited to, a disk storage device, an optical storage device, and a semiconductor storage device.

Web servers 130-1 to 130-N may be implemented through a desktop computer, workstation or any other web server system known in the art. Web servers 130-1 to 130-N may be equipped with web server software such as, Microsoft Internet Information Server, Novell Web Server, Netscape Enterprise Server, or any other Web server software known in the art. Web servers 130-1 to 130-N maintain and provide web sites that include one or more web pages that may be accessed over network 110 by client systems 120-1 to 120-N, and network server 140. Web servers 130-1 to 130-N may be associated with merchant network servers, and provide goods and/or services for sale over network 110, through the implementation of common electronic commerce techniques.

Network server 140 may provide application 125 consistent with features and principles of the present invention that may be downloaded to client systems 120-1 to 120-N. Network server 140 may also be associated with a credit issuer (150) and maintains credit account information for each customer accessing network 110 through a client system 120-1 to 120-N.

Database 144 connects to network server 140, and may store credit account information associated with customers of credit issuer 150. Database 144 may include a database or flat file data store, or may also include a flat file data store that flushes its stored data to another remote database for reliability and access time purposes. Furthermore, database 144 may include a redundant database that ensure data is available in the event a primary storage element experiences a fault or error. A multitude of fault tolerant architectures may be implemented to ensure data consistency and availability.

Credit issuer 150 may be an entity that provides financial accounts, such as credit cards, to customers. These customers may have access to client systems 120-1 to 120-N to purchases goods and/or services from web sites provided by web servers 130-1 to 130-N.

It should be noted that the configuration of system environment 100 is exemplary and not intended to be limiting. Any number of elements and connections may be implemented without departing from the scope of the present invention. In one aspect of the invention, the elements included in system environment 100 perform functions consistent with features and principles of the present invention. These functions may include providing credit account information to customers through network server 140 and client systems 120-1 to 120-N. The manner by which this information is provided to a customer may be through application 125 which may be provided by network server 140 and down loaded to client system 120-1 to 120-N.

Application 125 may be software that performs selected functions consistent with features and principles of the present invention. This software may be configured to monitor the network usage of its associated client system 120, as well as provide credit account related messages to a browser operating in the client system such that the messages are displayed on top of a browser window that includes an accessed web page.

Application 125 may be provided to client systems 120-1 to 120-N through the interaction between a customer and credit issuer 150, either through network server 140, or by other means, such as telephonically and conventional mail. In one aspect of the invention, customers request and register to receive application 125 from credit issuer 150. Once registered, network server 140 may download application 125 to a client system 120-1 to 120-N identified by the customer as the system they wish to have application 125 stored. Network server 140 may provide application 125 using standard Internet communication protocols. In one aspect of the invention, network server 140 may use the "polite push" techniques disclosed in U.S. Pat. No. 5,913,040 to download the application to a registered customer's client system while the system is connected to network 110 while the network utilization rate is low. Alternately, the application may be provided in the form of a diskette or optical disc sent to the customer through conventional mail services. The customer would then store the application into the local memory of their client system 120-1 to 120-N. Once stored at a client system 120-1 to 120-N, application 125 is activated when the client system starts-up.

In one aspect of the invention, the customer may select a customer message option when registering application 125. The customer message option allows the customer to tailor the types of messages that will be generated by application 125, and may include, but is not limited to, a discount message, an alternate site message, an account status message, an interactive account status message, an alternate item message, and a rating message. Each of these messages will be described in further detail with reference to FIGS. 3-9. The customer may select one or more of these message that they wish to be generated while accessing web sites provided by web servers 130-1 to 130-N.

Figure 2:
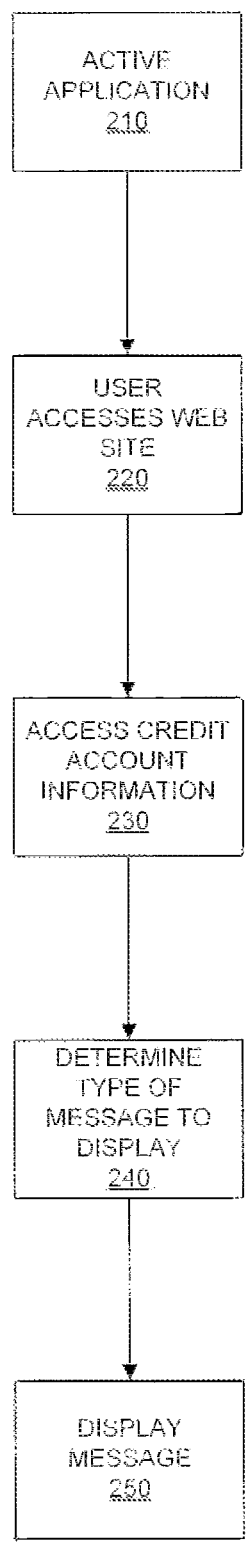
FIG. 2 illustrates an exemplary flow chart of a message process, consistent with features and principles of the present invention.

FIG. 2 is an exemplary flow chart of the steps performed by the application stored at a client system 120-1 to 120-N, consistent with features and principles of the present invention. As previously described, when a customer starts-up their client system 120-1 to 120-N at boot-up, application 125 is activated and begins monitoring the activities of the client system 120-1 to 120-N for an indication of access to network 110 (Step 210). This indication may be associated with a customer attempting to access network 110 in order to communicate with a web server 130-1 to 130-N. Of course, other entities attached to network 110 (not shown) may be accessed by client systems 120-1 to 120-N.

When client system 120-1 to 120-N accesses a web site provided by a web server 130-1 to 130-N, the browser executing within the client system renders a web page that is associated with the accessed web site. At this point, application 125 may detect that the user has accessed a web site (Step 220), and begins to retrieve credit account information associated with the registered customer associated with the application 125 stored on client system 120-1 to 120-N (Step 230). The credit account information may include parameters associated with a credit account provided by credit issuer 150 and held by the customer who has registered the application 125 stored in client system 120-1 to 120-N. The parameters may include, but is not limited to, current credit limit data, current outstanding balance data, previous purchase data, previous finance charges, previous payment data, upcoming payments that may be due, outstanding payments that are due, and any other data associated with a credit account.

The term "current" in the above examples may be associated with the last time a parameter for a credit account was updated by credit issuer 150. That is, a credit account may or may not have had transactions applied to it before the credit account information is retrieved by application 125, and before credit issuer 150 has updated the credit account to reflect the transaction. For example, a credit account may have a current account balance of $500 on Jul. 1, 2001. On the same day, a $200 purchase may be made with the account, reducing the actual credit account balance to $300. In this example, however credit issuer 150 may update accounts every day at a predetermined time. Therefore, if a customer associated with this hypothetical credit account wishes to receive current account status information before credit issuer 150 has updated the account balance to $300, application 125 may process and use the last current account balance it has access to, which in this case may be $500.

Methods, systems and articles of manufacturer, consistent with the present invention, may keep the credit account information current using various techniques. In one aspect of the invention, application 125 may utilize the polite push techniques disclosed by U.S. Pat. No. 5,913,040 to transparently transfer the current credit account information from network server 140 to client system 120-1 to 120-N. In this aspect of the invention, application 125 may recognize when client system 120-1 to 120-N has established communications with network 110, and initiates a request for the most recent credit account information for the customer associated with the registered application making the request. This request would be initiated when application 125 recognizes a low utilization rate with network 110. Network server 140 receives the request, collects the appropriate credit account information from database 144, and transfers the collected information to the application 125 that initiated the request.

Alternatively, application 125 may be configured to access the credit account information from network server 140 regardless of the network utilization rate associated with the client system 120-1 to 120-N. That is, as soon as communications are established with network 110, application 125 may initiate a request to download the most recent credit account information from network server 140.

Another manner by which the credit account information is kept up to date may be periodic pushes from network server 140 in response to requests from application 125 when its host client system 120-1 to 120-N has established communications with network 110. In this aspect of the invention, application 125 may keep track of an update cycle set by network server 140 and configured within the software of application 125. At the end of a cycle (i.e., every month, week, day, etc.), application 125 may initiate a request for the credit account information from network server 140 when its host client system 120-1 to 120-N has connected to network 110.

It should be noted that the above techniques for updating the credit account information associated with application 125 are exemplary, and not intended to be limiting. A number of various communication techniques may be implemented by methods and systems consistent with features of the present invention, without departing from the scope of the invention.

Returning to FIG. 2, once the credit account information is obtained (Step 230), which may include application 125 accessing the updated credit account information from a storage location within client system 120-1 to 120-N, application 125 determines a type of message to display (Step 240). The manner by which application 125 determines the type of message to display is described in further detail with respect to FIGS. 3-9.

Once the type of message is determined, application 125 provides the message to the browser executing within client system 120-1 to 120-N, that is rendering a web page associated with the accessed web site (Step 250). The messages may be provided in such a manner that they are presented on top of a window including a web page rendered by the browser and currently displayed on a display device in client system 120-1 to 120-N. The messages may be displayed as banner type windows, as rolling ticker messages that scroll across a portion of the viewing area of the display device, or as a separate pop-up window. The manner by which the messages are displayed are not limited to the examples above, and any number of combinations of audio and graphical presentations may be employed to present a message in any manner well known in the art.

Figure 3:
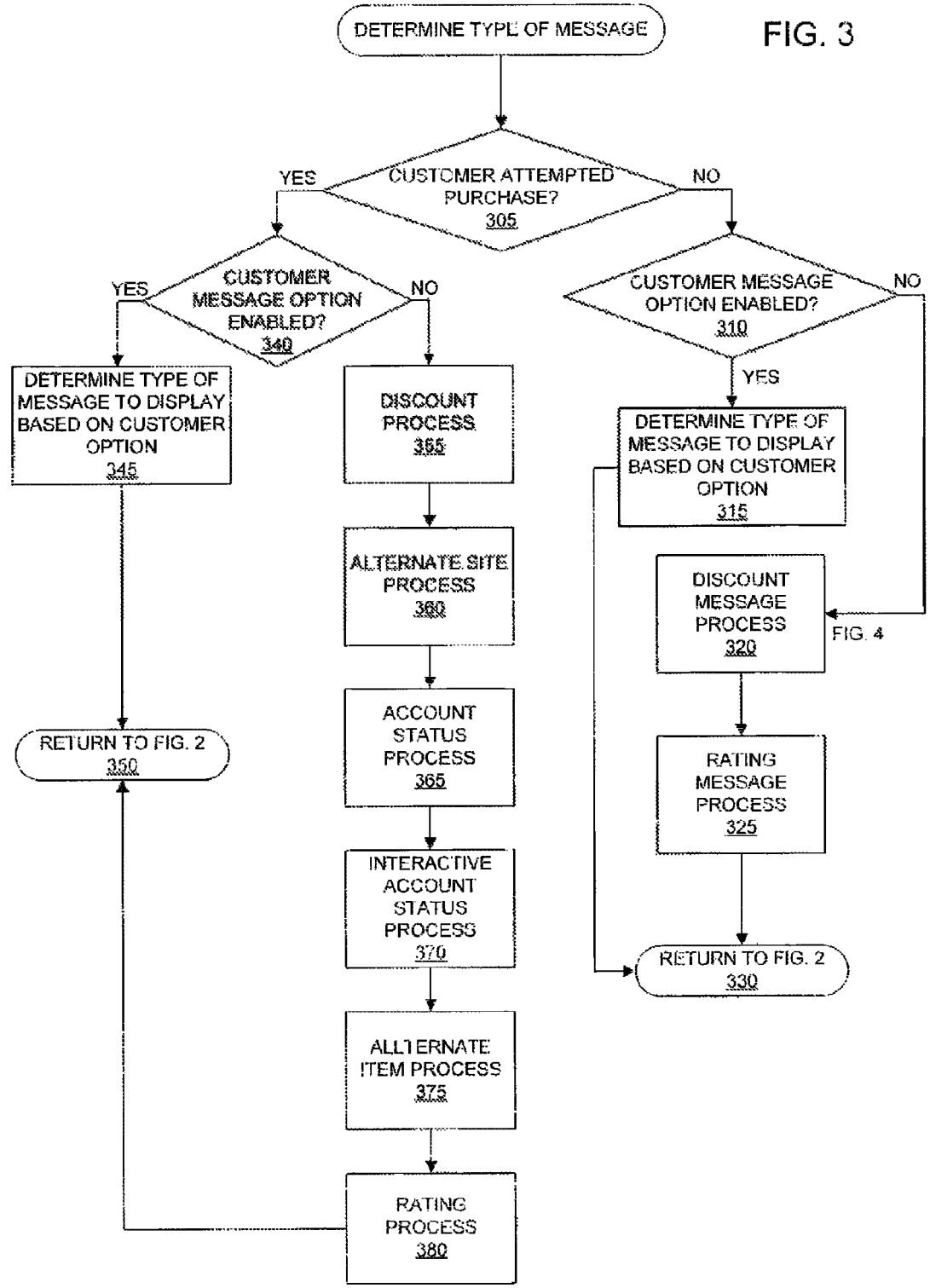
FIG. 3 illustrates an exemplary flowchart of a message determining process, consistent with features and principles of the present invention.

FIG. 3 illustrates an exemplary flowchart of a process to determine a type of message to display (Step 240), consistent with features and principles of the present invention. The process begins by application 125 determining whether the customer has attempted to purchase a good and/or service from the accessed web site described in Step 220 of FIG. 2 (Step 305). In one aspect of the invention, application 125 may detect an attempted purchase by recognizing when the customer indicates that a financial transaction is being attempted by interacting with a window provided by application 125 on top of a browser window rendering the web page provided by the accessed web site. For example, application 125 may be configured to provide a default message within a window that presents a query to the customer regarding an attempted purchase. For example, the message may include one or more icons or images (triggers) that the customer may select to indicate that a purchase is being attempted. The message may also include text requesting the customer to indicate that a purchase is being attempted. For example, the text may state, "Please select the PURCHASE icon if you will be attempting to purchase an item at this web site." The term "item" may be associated with a good and/or service. Of course, any combination of text and graphics may be used by methods and systems consistent with features of the present invention to provide a customer with such purchase queries Furthermore, any number of other techniques may be employed by application 125 to detect an attempted purchase by a customer, and methods and systems consistent with features of the present invention are not limited to the above examples.

Returning back to FIG. 3, if the customer has not attempted a purchase at the web site (Step 305; NO), application 125 determines whether the customer message option is enabled (Step 310). If so, application 125 determines the type of message to display based on the customer message option selected by the customer (Step 315). For example, if the customer has selected to only receive discount messages, application 125 will begin to perform the discount process illustrated in FIG. 4. If the alternate site message option was selected, application 125 will perform the alternate site process illustrated in FIG. 5. An account status message option will direct application 125 to perform the account status process depicted in FIG. 6, while an interactive account status message option will direct application 125 to perform the process shown in FIG. 7. Additionally, if the customer selected the alternate item message option, the alternate item process illustrated in FIG. 8 will be performed by application 125. And, a rating message option selected by the customer will direct application 125 to perform the rating process shown in FIG. 9. Furthermore, in the event the customer has selected to receive any combination of these messages, the appropriate message process will be performed by application 125. Once the appropriate message(s) are determined by application 125, the process is directed back to Step 250 (FIG. 2) for generating the message for display (Step 350).

However, if the customer has not selected the customer message option (Step 310; NO), application 125 may default by performing selected processes determined by network server 140, and programmed in application 125. In one aspect of the invention, application 125 may be directed to the discount process (Step 320) and the rating process (Step 325) for determining the type of discount and rating messages to display, respectively. Following these processes, application 125 may be directed to return to Step 250 (FIG. 2) for generating the message for display (Step 330). It should be noted that application 125 may be configured by network server 140 to perform any combination of processes, and methods and systems consistent with features of the present invention are not limited to the above examples.

Returning back to Step 305, if the customer has attempted to purchase a good and/or service from the accessed web site (Step 305; YES), application 125 determines whether the customer message option is enabled (Step 340). If the customer message option is enabled (Step 340; YES), application 125 determines the type of message to display based on the customer message option selected by the customer in a manner similar to Step 315 described above (Step 345). Once the appropriate message(s) are determined by application 125, the process is directed back to Step 250 (FIG. 2) for generating the message for display (Step 350).

However, if the customer message option is not enabled (Step 340; NO), application 125 may be directed to perform each process associated with a particular type of message to be rendered on top of a web browser window rendering a web page displayed at client system 120-1 to 120-N. As shown in FIG. 3, application 125 performs the discount process (Step 355), the alternate site process (Step 360), the account status process (Step 365), the interactive account status process (Step 370), the alternate item process (Step 375), and the rating process (Step 380), before returning to Step 250 (FIG. 2) for displaying the determined messages (Step 350).

It should be noted that the sequence of steps and the processes illustrated in FIG. 3 are not intended to be limiting. That is, application 125 may be configured to perform any message process in alternate sequences. For example, the account status process (Step 365) may be performed before the rating process (Step 380). Furthermore, additional or less processes may be implemented by application 125 that determine a particular type of message to display.

Figure 4:
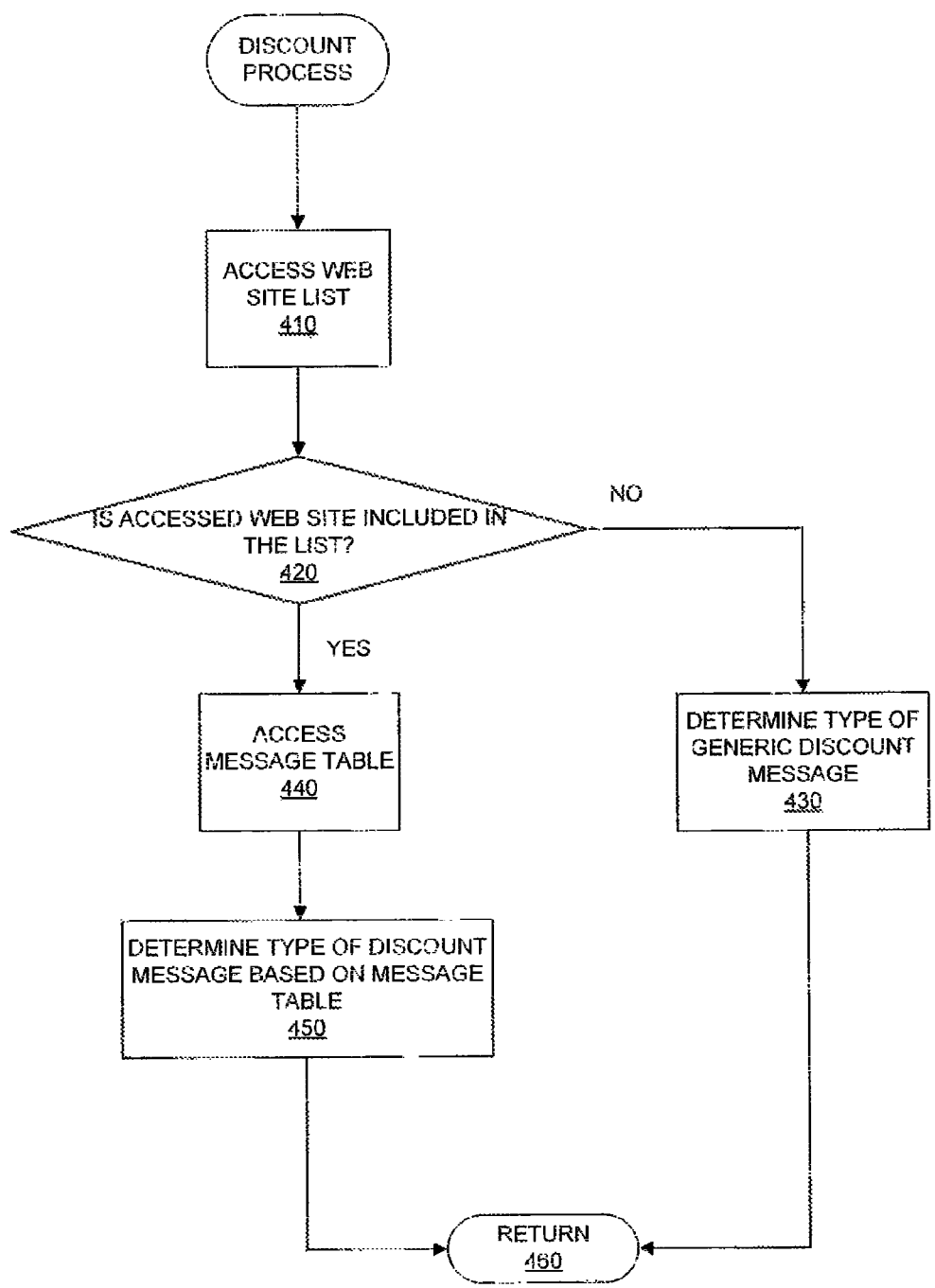
FIG. 4 illustrates an exemplary flowchart of discount processes, consistent with features and principles of the present invention.

FIG. 4 shows an exemplary flowchart of the discount process, consistent with features and principles of the present invention. As shown in FIG. 4, application 125 begins the discount process begins by accessing a web site list that may be stored at the client system 120-1 to 120-N that the customer is operating when the web site is accessed (Step 410). The web site list may be a table of web sites maintained by network server 140 that reflect a partnership agreement between credit issuer 150 and an entity that provides the web site and associated web server 130-1 to 130-N. This agreement may be to allow a listed web site's entity to offer purchase discounts or special deals associated with goods and/or services provided by the web site to customers of credit issuer 150. For example, a web site included in the web site list may reflect an agreement with credit issuer 150 to offer a 10% discount to a customer of credit issuer 150 on purchases from the web site. Of course, any type of agreement may be implemented between an entity that provides a web site and credit issuer 150, and is not limited to the above example.

In one aspect of the invention, the web site list may be stored at the client system 120-1 to 120-N operated by the customer. The list may be updated by network server 140 using the polite push techniques described above and in U.S. Pat. No. 5,913,040. That is, application 125 may issue a request to network server 140 to update or modify the list when a client system accesses network 110 and network utilization is low. Alternatively, application 125 may ignore network usage rate, and request an update as soon as it detects a connection between the client system 120-1 to 120-N to network 110. Furthermore, the update of the web site list may take place periodically, for example once a week, or may be performed each time the client system 120-1 to 120-N connects to network 140. In another aspect of the invention, the web site list may be stored remotely from client system 120-1 to 120-N, for example at network server 140 or database 144, and accessed by application 125 when needed. A variety of techniques may be implemented by methods and system consistent with features of the present invention to ensure the web site list is updated, and are not limited to the above examples.

Returning back to FIG. 4, after the web site list is accessed, application 125 determines whether the accessed web site is included within the web site list (Step 420). If not (Step 420; NO), application 125 may determine a type of generic discount message to display (Step 430). A generic discount message may be associated with web sites that are associated with entities that do not have an agreement with credit issuer 150. The generic discount message may be configured to be associated with a discount or special deal provided by credit issuer 150 to its customers. For example, a generic discount message may reflect an indication that a customer will receive a 5% discount for any purchase made from the accessed web site using their credit account associated with credit issuer 150. Alternatively, the generic message may indicate that the customer may receive a waiver of annual fees associated with their credit account when a purchase is made at the accessed web site above a predetermined amount. As can be seen, the type of message that application 125 provides may reflect any number of offers from credit issuer 150, and are not limited to the above examples. Additionally, instead of a discount message, credit issuer 150 may have configured application 125 (through network server 140) to merely present an advertisement for the credit issuer 150, or a discount if the customer accesses a web site provided by credit issuer 150. The generic message to be displayed may be dynamically updated and modified at any time while the customer's client system 120-1 to 120-N is connected to network 110, in a manner similar to the techniques of updating the web site list described above.

Once application 125 determines the type of generic discount message to display, the discount process ends and application 125 returns to the appropriate step where the discount process was invoked (Step 460). For example, referring to FIG. 3, the discount process was performed at Step 355. Accordingly, Step 460 of the discount process would return application 125 to Step 360, which may be the next step in the process shown in FIG. 3.

Referring back to Step 420, in the event the accessed web site is included in the list (Step 420; YES), application 125 may access a message table corresponding to the accessed web site (Step 440). The message table may be a list of formatted messages provided by network server 140 and credit issuer 150 associated with each web site included in the web site list. The formatted messages may include one or more predetermined discount messages to display that application 125 may select. The formatted discount message may reflect various discounts or special offers associated with the accessed web site. These formatted discount messages may include, but is not limited to, a specific discount message associated with particular goods and/or services offered by the accessed web site. For example, a first discount message associated with accessed web site may reflect a 10% discount on the purchase of an item offered by the web site, while a second discount message may reflect a 10% on any purchase made from the accessed web site using the credit account provided by credit issuer 150. As can be seen, any number of discount messages may be provided in the message table for each web site included in the web site list, and are not limited to the above examples. As with the generic discount message (Step 430), the message table may be updated and modified using the same techniques previously described for updating the web site list.

Once the message table is accessed, application 125 may determine the type of discount message to display (i.e., chose a formatted discount message from the message table) (Step 450). The process of determining the type of discount message to display based on the message table may be performed in a variety of ways, including, but not limited to, random selections and predetermined criteria associated with the customer's credit account. For example, a particular discount message may be offered to customer whose credit limit is above a certain value, while another discount message may be offered to customers whose credit limit is below the value. The credit account information accessed in Step 230 of FIG. 2 may be used by application 125 to perform the credit limit analysis, and determine which discount message in the message table to present for display. The above described criteria are exemplary and not intended to be limiting. Other criteria may be used by application 125 to determine the type of formatted discount message to display from the message table.

Once application 125 determines the type of formatted discount message to display, the discount process ends and application 125 returns to the appropriate step where the discount process was invoked (Step 460). It should be noted that the sequence of steps and the processes illustrated in FIG. 4 are not intended to be limiting and application 125 may be configured to perform the steps of FIG. 4 in alternate sequences.

Figure 5:
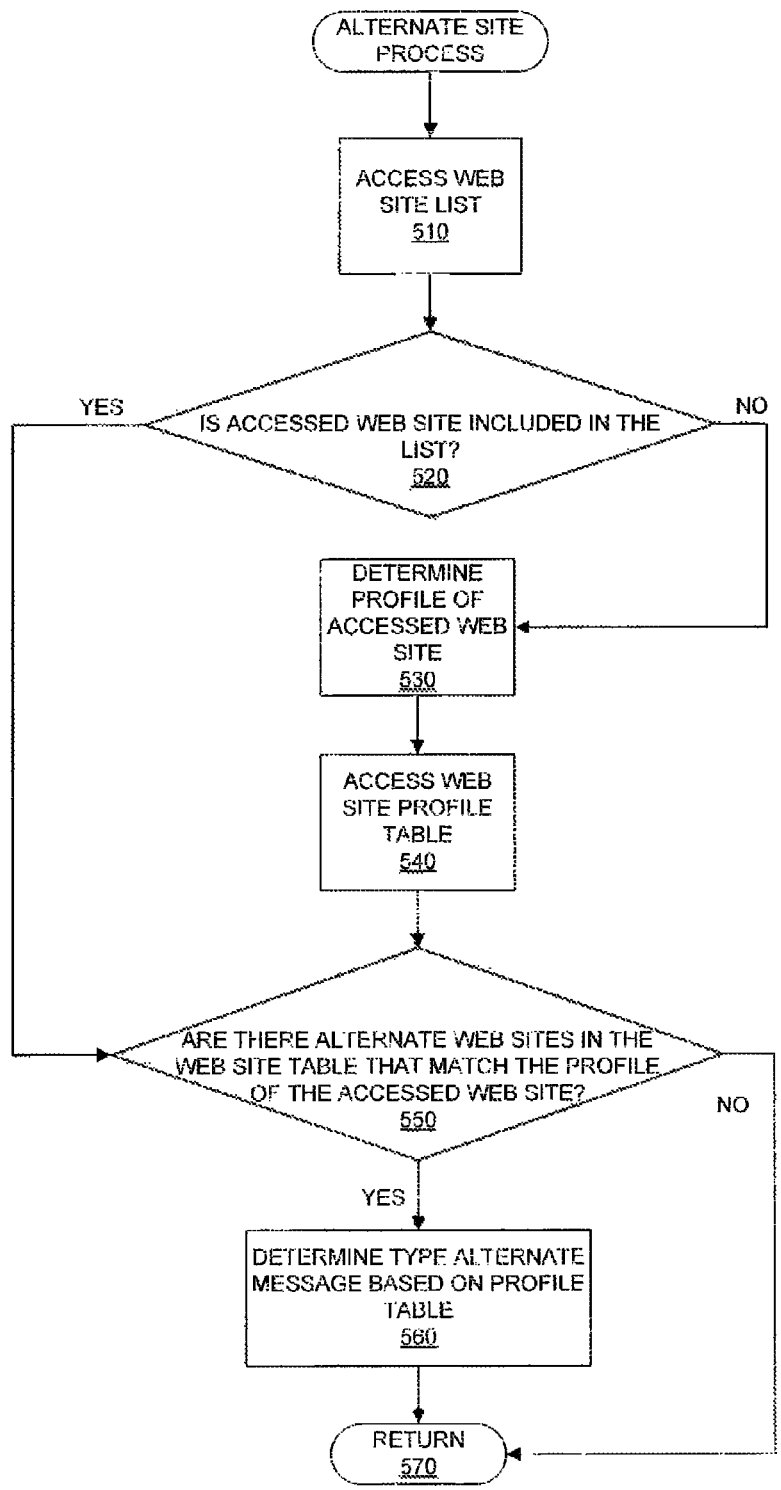
FIG. 5 illustrates an exemplary flowchart of an alternate site process, consistent with features and principles of the present invention.

FIG. 5 illustrates an exemplary alternate site process performed by application 125, consistent with features and principles of the present invention. As shown in FIG. 5, application 125 begins the alternate site process by accessing the web site list previously described with reference to Step 410 of FIG. 4 (Step 510). Once the web site list is accessed, application 125 determines whether the accessed web site is included in the web site list (Step 520). If not (Step 520; NO), application 125 may be configured to determine a profile of the accessed web site (Step 530). A profile of a web site may be associated with particular goods and/or services offered by the web site. For example, a merchant web site that provides clothing may be profiled as a clothing web site. Furthermore, if the merchant web site offers only athletic clothing, the profile of the merchant web site may be set as a sports clothing web site. Alternatively, the same merchant web site may be associated with two profile categories: sports and clothing. Application 125 may be configured to perform this analysis by determining the types of goods and/or services provided by the web pages rendered at the client system 120-1 to 120-N operated by the customer. Other methods and techniques may be employed to associate a profile with the accessed web site, and the examples described above are not intended to be limiting. For example, application 125 may forward the web site's identification to network server 140 for profile processing. The profile processing may take place using an expert system configuration, where a knowledge base including selected rules defined by credit issuer 150 are employed to determine the type of profile of the accessed web site.

Once the profile for the accessed web site is determined, application 125 may access a web site profile table (Step 540). In one aspect of the invention, a web site profile table may be maintained by network server 140 and includes profile categories for the web sites included in the web site list. This table may be configured to associate each listed web site with a profile and may be located at network server 140 and accessed by application 125 when a web site included in the list is accessed. Alternatively, the profile table may be downloaded to client system 120-1 to 120-N and accessed locally by application 125 when needed. Further, the web site profile table may be stored at the client system 120-1 to 120-N when application 125 is registered, and updated (periodically or continuously) in a manner similar to that previously described for updating the web site list. The profile table may be associated with the web site list, or alternatively, the web site list may contain a field for each web site including its associated defined profile.

After accessing the web site profile table, application 125 may determine whether there are any web sites in the web site list with a profile that matches the profile of the accessed web site (Step 550). If so (Step 550; YES), application 125 then determines a type of alternate web site message to display based on the determined profile (Step 560). Application 125 may be configured to perform Step 560 by selecting a web site with a profile that matches the profile of the accessed web site, and configuring a message that indicates to the customer that the selected web site offers similar goods and/or services that the accessed web site offers. This message may be combined with the discount process message to create a message that indicates that a discount may be obtained if the customer purchases goods and/or services at the selected web site with their credit account provided by credit issuer 150. Of course, any combination of messages, or information, may be included within the alternate site message that indicate that an alternate site (one with an agreement with credit issuer 150) provides goods and/or services similar to that provided by the accessed web site.

In another aspect of the invention, if the web site profile table indicates that there are more than one web site included in the web site list that matches the profile of the accessed web site, application 125 may randomly select a single web site to include in the alternate web site message. Alternatively, application 125 may also include a list of all of the matching web sites in the message. Other techniques may be implemented by application 125 to select one or more alternate web sites to include in the alternate web site message. For example, the message table previously described with reference to FIG. 4 may include, for each listed web site, alternate web site formatted messages that indicate the types of goods and/or services provided by a respective web site. Application 125 may access the message table and select the appropriate formatted message for display by client system 120-1 to 120-N.

Returning back to Step 550, in the event there are no alternate web sites with a profile that matches the profile of the accessed web site (Step 550; NO), the alternate web site process ends and application 125 returns to the appropriate step where the alternate web site process was invoked (Step 570).

Referring back to Step 520, if the accessed web site is included in the web site list (Step 520; YES), application 125 accesses the web site profile table (Step 540) and determines whether there are any web sites in the web site table that match the profile of the accessed web site as previously described (Step 550). Additionally, as described above, if there are matching web sites (Step 550; YES), application 125 then determines a type of alternate web site message to display based on the determined profile (Step 560). Once application 125 determines the appropriate alternate web site message to display, the alternate web site process ends and application 125 returns to the appropriate step where the alternate web site process was invoked (Step 570).

It should be noted that the sequence of steps and the processes illustrated in FIG. 5 are not intended to be limiting and application 125 may be configured to perform the steps of FIG. 5 in alternate sequences.

Figure 6:
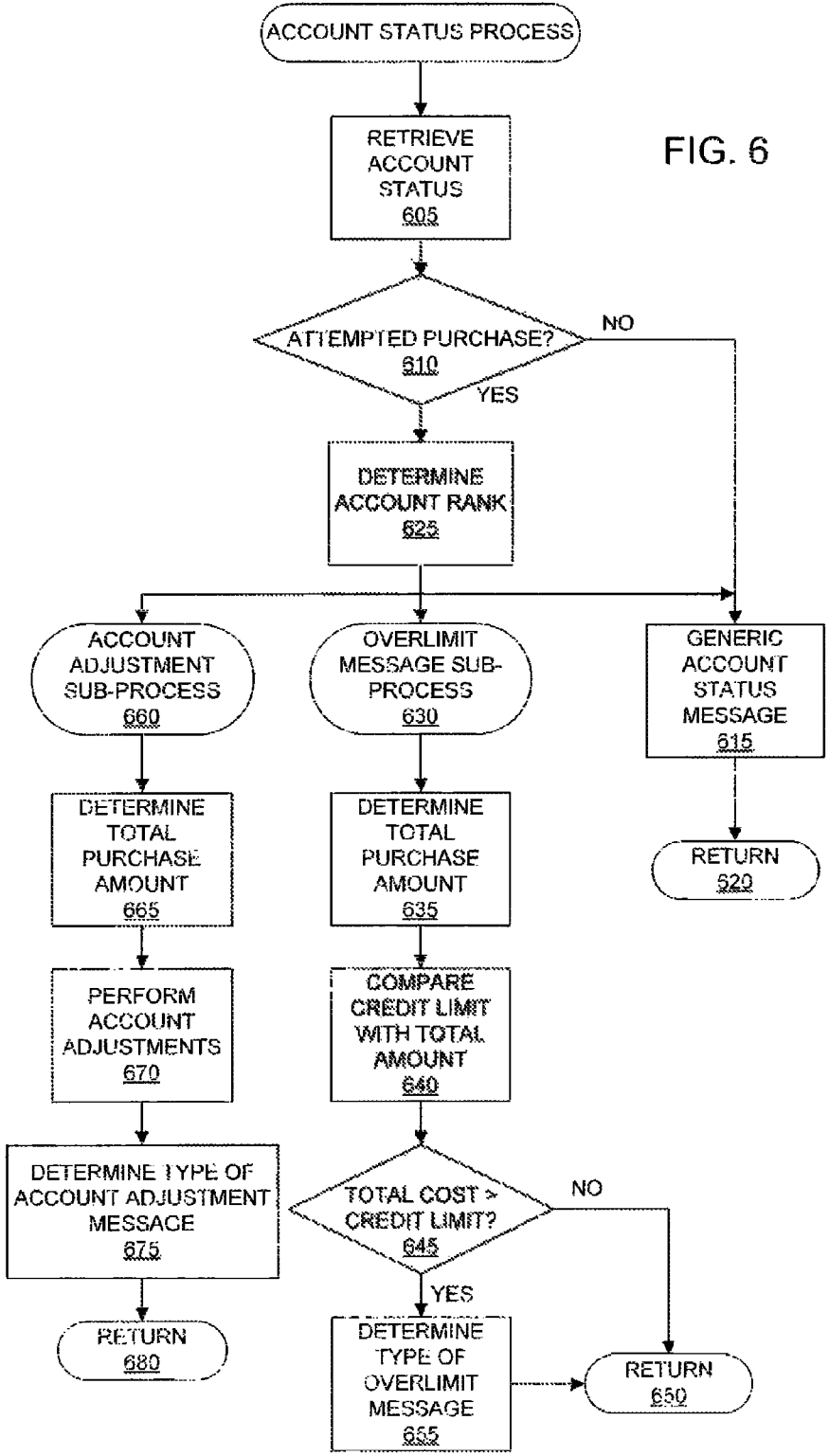
FIG. 6 illustrates an exemplary flowchart of an account status process, consistent with features and principles of the present invention.

FIG. 6 illustrates an exemplary account status process performed by application 125, consistent with features and principles of the present invention. As shown in FIG. 6, application 125 may begin the account status process by retrieving the current status of the credit account associated with the customer corresponding to application 125 (Step 605). The current account status may include, but is not limited to, a current credit limit, outstanding balance, and interest rate associated with the credit account of the customer. Additionally, the status of the credit account may also include data reflecting transaction history information such as previous purchases with the credit account, past due amounts, finance fees, and any other type of information associated with the credit account. The credit account status information may be obtained from the information retrieved in Step 230 of FIG. 2 and stored locally within the client system 120-1 to 120-N operated by the customer.

After the status of the customer's credit account is retrieved, application 125 may determine whether the customer attempted to purchase a good and/or service from the accessed web site in a manner similar to that described for Step 305 of FIG. 3 (Step 610). If the customer has not attempted to make a purchase (Step 610; NO), application 125 may determine a type of generic account status message to display (Step 615). The generic account status message may include the information retrieved in Step 605, such as current credit limit and outstanding balance. Additionally, the generic account status message may include the transaction history information associated with the credit account. Alternatively, the generic account message may include an indication of when a next payment is due (if any) to credit issuer 150, as well as any penalty fees that may or may not be assessed if the payment is late. Furthermore, the generic status message may include an indication that there is a payment past due, as well as the amount of the payment and any associated penalty fees. As can be seen, any type of information associated with the credit account may be included or excluded from the generic account status message. Application 125 may be configured to provide credit account data determined by network server 140, or may determine the information to include in the message autonomously.

Returning back to Step 610, if application 125 determines that the customer has attempted to make a purchase at the accessed web site (Step 610; YES), the rank of the credit account may be determined (Step 625). The rank of the credit account may reflect a value used by credit issuer 150 (and application 125) to segregate certain types of customers from others. For instance, a customer with a credit account that has a low rank value (such as 1 out of 10) may be determined to be a highly valued customer. The determination may be based on the customer's payment history (always on time), number of purchases (the customer uses the credit account quite often), and the outstanding balance (the customer tends to keep a balance associated with the credit account). Alternatively, the ranking may be based purely on the outstanding balance and/or credit limit of the credit account. For example, a credit account may receive a lower rank based on the value of its credit limit because generally higher credit limits are offered to customers with a lower credit risk. Other techniques to determine a rank value for the credit account may be employed by methods and systems consistent with features of the present invention and are not limited to the examples described above.

Once the credit account is ranked, application 125 may perform one or more sub-processes of the account status process. In one aspect of the invention, application server 125 may be configured to perform an account adjustment sub-process (Step 660), an overlimit message sub-process (Step 630) and determine a generic account status message (Step 615), either simultaneously (via multi-tasking operations) or sequentially. Alternatively, application 125 may be configured to perform only one of the above mentioned sub-processes or a combination of two of them.

The overlimit message sub-process (Step 630) begins by application 125 determining the total amount of the attempted purchase (Step 635). In one aspect of the invention, application 125 may determine a purchase amount by providing a query in a message provided on top of the browser window displayed at client system 120-1 to 120-N. The query message may request the customer to provide a purchase amount by entering in the amount using an input device, such as a keyboard. The query message may include graphics and/or text that requests the purchase amount from the customer. Icons or other graphical images may be used to allow a customer to complete an indication of a purchase amount. The customer may obtain the purchase amount information be simple transferring the cost of an item (or items) from the rendered web page to the message window provided by application 125. This may be done by well known data entry techniques, including data cut and paste operations known in the art.

Once the purchase amount is provided by a customer, application 125 compares the credit limit associated with the credit account with the total amount of the purchase (Step 640) and determines whether the total amount and the outstanding balance exceeds the credit limit (Step 645). If the total amount for the purchase and outstanding balance does not exceed the credit limit, application 125 returns processing to the step that invoked the account status process (Step 650). Alternatively, as previously discussed, application 125 may determine whether the other sub-processes have been executed yet, and if not, may begin performing those non-executed sub-processes.

Returning back to Step 645, if the amount of the total purchase does exceed the credit limit of the credit account (Step 645; YES), application 125 determines a type of overlimit message to display (Step 655) and then returns processing to the step that invoked the account status process (Step 650).

In one aspect of the invention, the type of overlimit messages that application 125 may choose may vary based on the rank of the credit account. For example, a credit account with a low rank (which may depict a valued customer by credit issuer 150) may receive a credit limit extension message. That is, suppose the credit limit and outstanding balance for a credit account with a low rank value is $1000, and $500, respectively. Further suppose the customer has attempted to purchase an item for $600. In this example, application 125 may be configured to provide a message that reflects that the credit limit will be exceeded if the purchase is made. In addition to the credit limit information, application 125 may be configured to include in the message an offer for a credit limit extension if the item is purchased using the credit account. The extension may be equal or greater to that of the total amount of the item to be purchased, such as $100 for the above example. In one aspect of the invention, another message may be provided by application 125 that requests acceptance from the customer for the credit limit extension. This may be performed through text and/or graphics, such as icons, that may be selected to indicate acceptance of the credit limit extension. Once accepted by a customer, application 125 may be configured to provide the credit limit extension acceptance to credit issuer 150, where the appropriate credit account parameters may be adjusted to reflect the credit limit extension. Subsequently, credit issuer 150 may provide an acknowledgment of the extension to application 125, which in turn, may provide another message indicating to the customer that the credit limit has been extended and for what amount.

In another aspect of the invention, a credit account with a high rank value may direct application 125 to provide an overlimit message without an offer for a credit limit extension. Accordingly, application 125 may determine a type of overlimit message based on the rank of the credit account, and the results of the process performed in Step 645. Application 125, however, is not restricted using a credit account's rank to determine a type of overlimit message to display. In one aspect of the invention, application 125 may be configured to only provide a message with an overlimit warning. A number of various techniques may be employed by application 125 to determine a type of overlimit message and the above examples of the overlimit messages not intended to be limiting and may include or exclude various credit account information.

The account adjustment sub-process (Step 660) begins by application 125 determining the total amount of the attempted purchase (Step 665). This may be performed in a manner similar to that previously described for Step 635. Afterwards, application 125 applies the total amount to selected credit account parameters, such as credit limit and outstanding balance, to determine a new credit account status (Step 670). For example, suppose a credit account associated with the customer has a current credit limit of $1000 and an outstanding balance of $700, and an attempted purchase of $200. In this example, application 125 would determine that the new outstanding balance would be $100 if the attempted purchase was actually made. Additionally adjustments may also be made based on the configuration of application 125 and the criteria desired by credit issuer 150.

For example, application 125 may be configured to determine a new minimum payment amount that would be due if the purchase was made, and the amount of finance fees that would be incurred if only minimum payments were made for a predetermined amount of time (i.e., 12 months). A variety of credit account adjustments may be made based on the attempted purchase, and are not limited to the examples described above.

Once application 125 has made the appropriate adjustments to the credit account, a type of account adjustment message is determined (Step 675), and the process may return to the step that invoked the account status process (Step 680). Alternatively, as previously discussed, application 125 may determine whether the other sub-processes have been executed yet, and if not, may begin performing those non-executed sub-processes.

It should be noted that the sequence of steps and the processes illustrated in FIG. 6 are not intended to be limiting and application 125 may be configured to perform the steps of FIG. 6 in alternate sequences.

Figure 7:
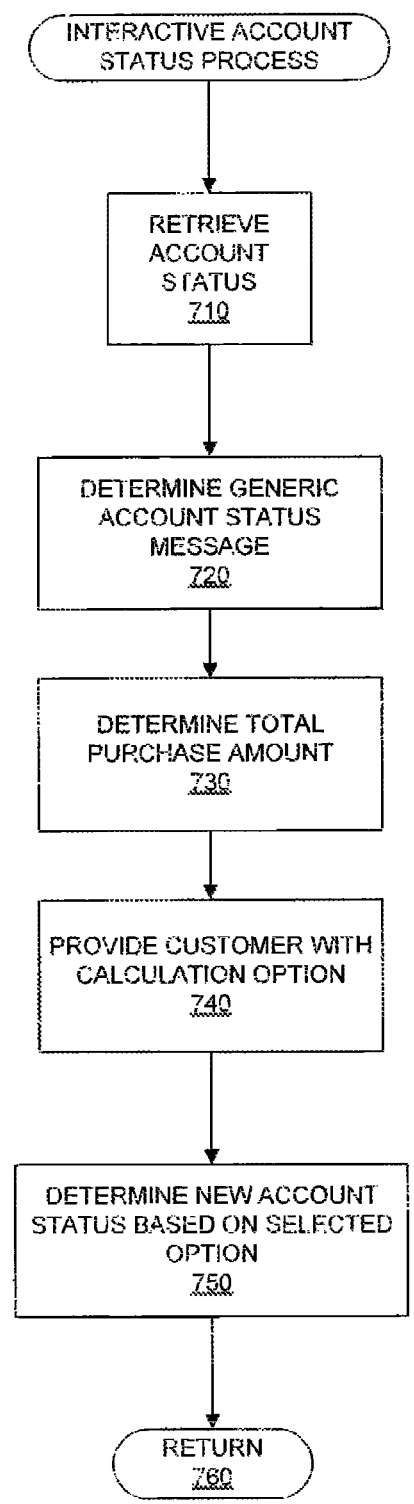
FIG. 7 illustrates an exemplary flowchart of an interactive account status process, consistent with features and principles of the present invention.

FIG. 7 illustrates an exemplary flowchart of the interactive account status process performed by application 125, consistent with features and principles of the present invention. As shown in FIG. 7, application 125 begins the interactive account status process by retrieving the current status of the credit account associated with the customer corresponding to application 125 in a manner similar to that described for Step 605 of FIG. 6 (Step 710). Once the account status information is retrieved, application 125 may determine the type of generic account status message to display, in a manner similar to that previously described for Step 615 of FIG. 6 (Step 720). Next, application 125 may determine the total amount for the attempted purchase detected in Step 305 of FIG. 3 (Step 730). The purchase amount may be determined in a manner similar to that previously described for Step 635 (FIG. 6). Afterwards, application 125 may provide an account calculation option to the browser executing within the client system 120-1 to 120-N operated by the customer (Step 740).

The calculation option may be a message that presents one or more options to a customer to aid them in determining how their credit account will be affected if the attempted purchase is made. For example, in one aspect of the invention, the calculation option may allow a customer to determine how long (i.e., how many monthly payments) it would take to pay off the total purchase amount for a fixed payment amount. In this example, the customer would be allowed to present the fictitious payment amount and application 125 would calculate the number of payments to pay off the purchase. Alternatively, the customer may be allowed to determine what amount would need to be paid to credit issuer 150 for each of a fixed number of payments cycles (i.e., months) to pay off the amount of the total attempted purchase using the credit account. In this example, the customer may provide the number of payment cycles.

It should be noted that the examples described are exemplary and not intended to be limiting. A number of different options may be provided by application 125 to the customer to provide an interactive tool that enables a customer to view changes to their credit account, based on criteria defined by the customer.

Once the customer provides a response to the particular type of results they wish to see, application 125 utilizes the results to adjust the status of the credit account to determine a type of interactive account status message to display (Step 750). For instance, following the examples above, a customer may include in the response an indication to determine the number of monthly payments it would take to pay off a purchase transaction at the current interest rate for the credit account. Application 125 may perform these calculations, and provide a message that indicates the number of payments, and possibly the finance fees the customer would have to pay during that time frame as well. Accordingly, methods, systems, and articles of manufacturer consistent with features of the present invention enable a customer to interact with an initial account status message that may show the current credit account parameters for the credit account in order to view the changes to their account associated with an attempted purchase. In this aspect of the invention, a customer merely has to indicate a purchase price of a selected goods and/or service in a manner similar to that described in Step 635 (FIG. 6). Application 125 may then provide a message for display that allows the customer to analyze the affects of the attempted purchase on their credit account, as well as determine various payment options that appeal to the customer's financial lifestyle.

Returning back to FIG. 7, once the appropriate message type is determined, the interactive account status process ends, and application 125 returns to the step that invoked this process (Step 760).

It should be noted that the sequence of steps and the processes illustrated in FIG. 7 are not intended to be limiting and application 125 may be configured to perform the steps of FIG. 7 in alternate sequences.

Figure 8:
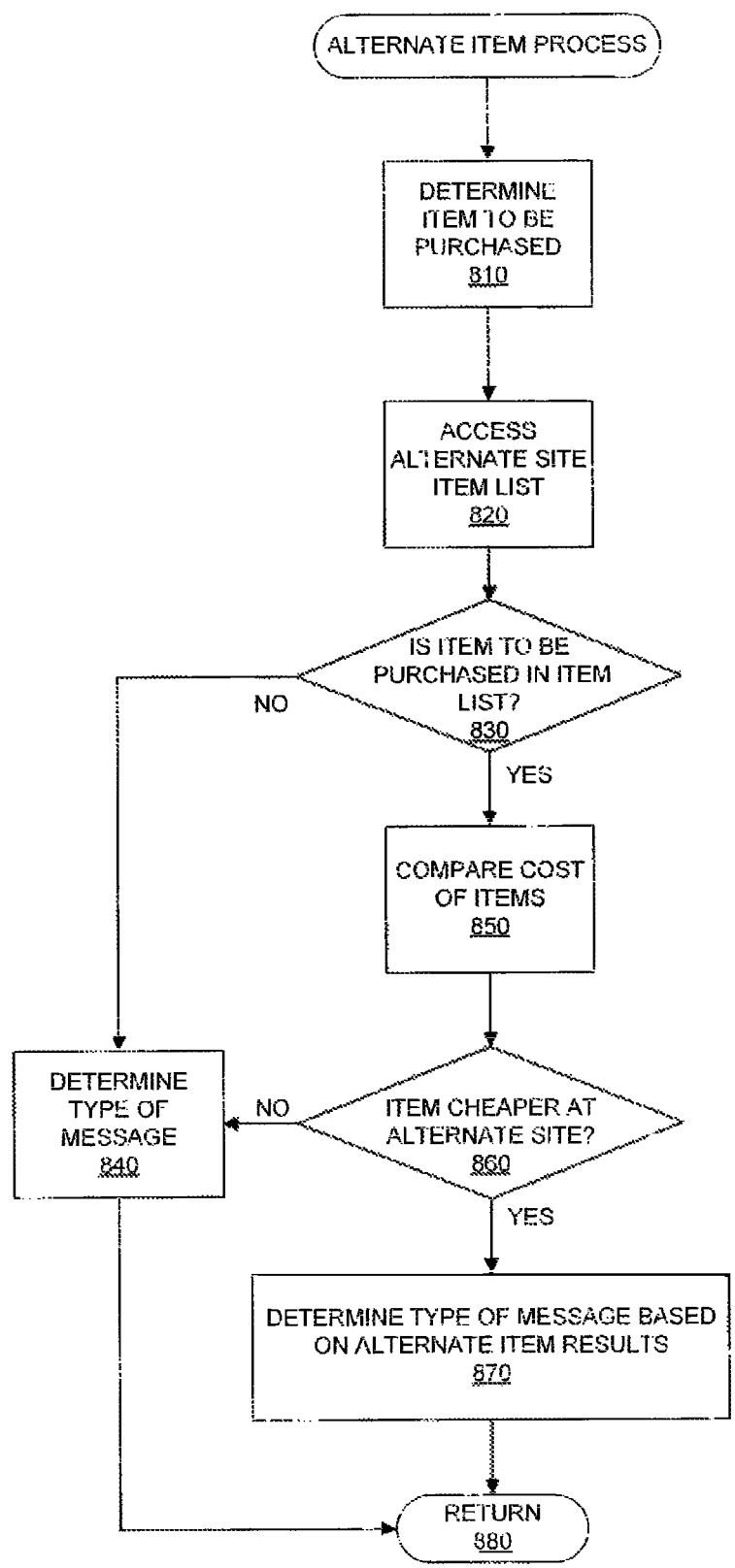
FIG. 8 illustrates an exemplary flowchart of an alternate item process, consistent with features and principles of the present invention.

FIG. 8 illustrates an exemplary alternate item process performed by application 125, consistent with features and principles of the present invention. As shown in FIG. 8, application 125 may begin the alternate item process by determining the item that is attempted to be purchased at the accessed web site (Step 810). The term "item" may be associated with a good and/or service provided by the accessed web site, and attempted to be purchased by a customer. Additionally, the type of item may be very specific (i.e., specified by serial or catalog number) or generic (general description such as a football, golf ball, etc.). Application 125 may determine the type of item based on profiles, catalog numbers, serial numbers, text description associated with the item, that may be provided by the customer through an item query window provided by application 125. The item query window may enable a customer to provide a description of the item to be purchases, catalog, SKU, and serial number, purchase price of the item. Alternatively, the item query window may provide a drop down menu of predetermined categories of items, such as clothing, vehicles, etc., that the customer may use to describe the item to be purchased. There are a number of different ways methods and systems consistent with features of the present invention may determine the type of item to be purchased, and are not limited to the above examples.

Once the type of the item attempted to be purchased is determined, application 125 determines whether there is a similar or identical item included in an item list maintained by network server 140 (Step 830). The item list may be associated with the web site list, and possibly the profile table, and may reflect items provided by each web site. The item list may include descriptive information in various details, depending upon the level of granularity credit issuer 150 wishes to provide in the alternate item process. In one aspect of the invention, various description fields reflecting detailed identification codes are maintained for each item provided by each web site in the web site list. The description fields may provide detailed information associated with a particular item, such as serial numbers, manufacturer codes, etc. In another aspect of the invention, the description fields may include less descriptive information associated with each item, such as a general description and perhaps manufacturer code.

In the event the item to be purchased is not included in the item list (Step 830; NO), application 125 may determine a type of item message to display (Step 840). In one aspect of the invention, the item message may include an indication that the particular item to be purchased is not offered by any alternate web sites included in the credit issuer's 150 database. A variety of various messages may be provided by application 125, and methods and systems consistent with features of the present invention are not limited to the above example. Once the type of item message is determined by application 125, the alternate item ends, and application 125 is directed back to the step that invoked the alternate item process (Step 880).

Returning back to step 830, if the item to be purchased is located within the item list (Step 830; YES), application 125 may then be configured to compare the price of each item (Step 850). In one aspect of the invention, the customer may have provided the purchase price of the item to be purchased when it was described in Step 810. Alternatively, another window message may be provided by application 125 that allows the user to provide the purchase price of the item, in a manner similar to that described for Step 635 (FIG. 6).

If the item to be purchased is determined by application 125 to be cheaper than that the matching item in the item list (Step 860; NO), a type of item message may be determined, similar to that described above (Step 840). In one aspect of the invention, application 125 may provide an item message that indicates that the purchase amount for the item to be purchased at the accessed web site is the cheapest according credit issuer's 125 database. Processing then continues to Step 880 for return back to the step that invoked the alternate item process (Step 880).

If the purchase price, however, of the item to be purchased is not cheaper than the matching item included in the item list (Step 860; YES), application 125 may determine a type of item message that reflects this (Step 870). That is, the item message may include an indication that the particular item, or one similar to it, may be purchased at a cheaper price at an identified alternate web site. The message may also include a hyper link to the alternate site as well. Other types of indications may be included within the determined item message, and are not limited to the above example. Once application 125 determines the type of item message to display, processing is returned to the step that initiated the alternate item process.

It should be noted that the sequence of steps and the processes illustrated in FIG. 8 are not intended to be limiting and application 125 may be configured to perform the steps of FIG. 8 in alternate sequences.

Figure 9:
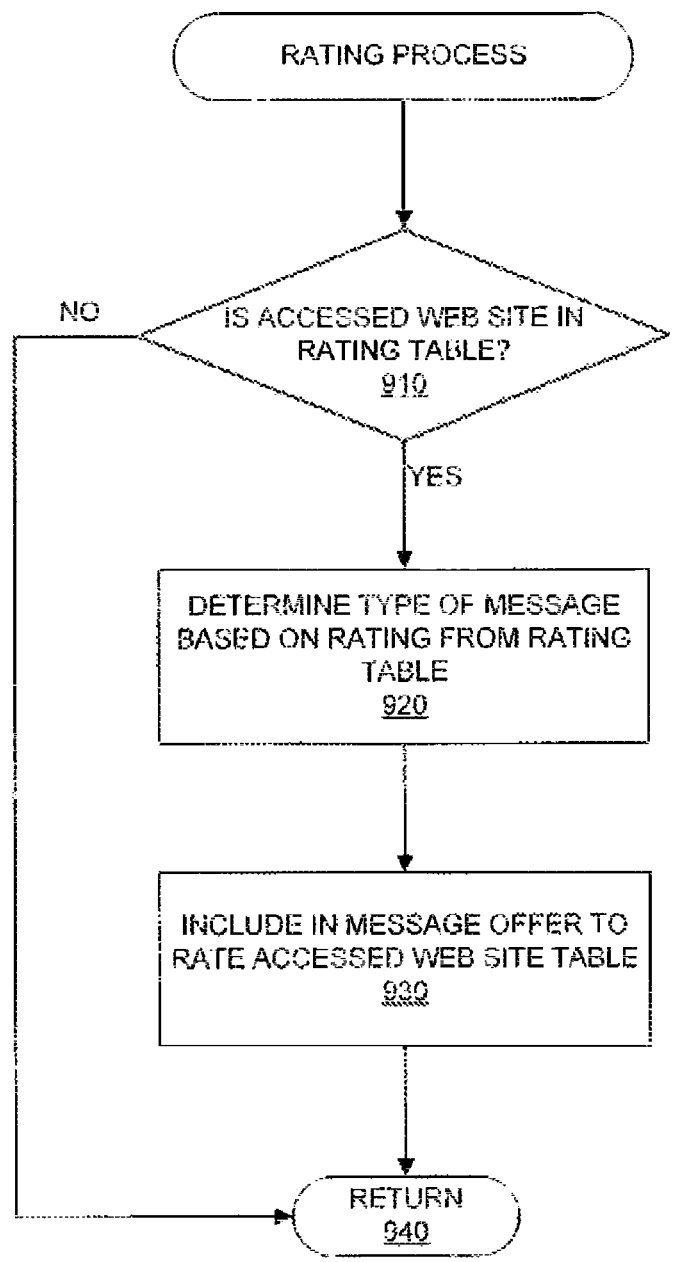
FIG. 9 illustrates an exemplary flowchart of a rating process, consistent with features and principles of the present invention.

FIG. 9 shows an exemplary flowchart of the rating process performed by application 125, consistent with features and principles of the present invention. As shown in FIG. 9, the rating process begins with application 125 determining whether the accessed web site is included in a rating table (Step 910). The rating table may be a listing of web sites that are associated with a rating value provided by credit issuer 150. The rating value may be based on a variety of criteria including, but not limited to, fraudulent activity, security problems, customer service, product distribution, and any other type of category that may be associated with a merchant web site. In one aspect of the invention, credit issuer 150 provides a rating table for selected web sites that have been reported by customers, and even outside entities, such as reporting agencies.

Returning back to step 810, if the accessed web site is not included in the rating table, application 125 may end the rating process and return back to the step that invoked the rating process (Step 940). On the other hand, if the accessed web site is included in the web site (Step 810; YES), application 125 determines a type of message to display based on the rating value associated with the accessed web site (Step 920). The rating message may include indications of the rating value or values, and their associated definitions. Furthermore, the criteria for rating the web site may be included in the message, such as the various values a web site may receive, and their corresponding criteria. As can be seen, any number of rating categories may be provided by credit issuer 150, and are not limited to the above examples.

Once the type of rating message is determined by application 125, another indication may be provided in the message that offers the customer an opportunity to personally rate the web site (Step 930). In one aspect of the invention, the message may include the appropriate categories and rating values to select for the accessed web site. The customer, once the message is actually displayed, may select a rating value and this information is passed to network server 140 for updating the rating table. Alternatively, the rating table may be stored locally at the client system 120-1 to 120-N, and application 125 may update the table accordingly. Furthermore, the rating message may include a hyperlink that automatically sends the personal rating value to network server 140 when selected. A number of different techniques may be implemented by methods and systems consistent with features of the present invention that enable the rating table to be updated with the customer's personal rating value. The rating process may end at Step 940 either after the customer provides a personal rating response, or immediately after the rating message is configured according to process Steps 920 and 930.

As described, methods and systems consistent with features and principles of the present invention enable a credit issuer to provide an application to a customer's computer system that enables the customer to receive credit account messages while browsing web sites over a network. The credit account messages may be dynamic in that credit account status information may automatically change according to attempted purchases of goods and/or services at a merchant's web site. Additionally, the credit account messages may also be interactive and enable a customer to tailor specific credit account information to determine specific changes to their credit account based on an attempted purchase at an accessed web site. Furthermore, in addition to credit account messages, rating messages may be provided that indicate a rating value associated with the accessed web site. Moreover, the customer may participate in rating the web site by providing a personal rating value to the credit issuer using the rating message as a response vehicle.

Variations of the methods and systems consistent with features of the present invention previously described may be implemented without departing from the scope of the invention. For example, the types of message described above may be altered and changed in any format to comply with the credit issuer's marketing strategies. Also, application 125 may be configured to perform only one or more of the process depicted in FIG. 3, as well as new processes not shown in the figures. Furthermore, the message windows provided by application 125 that allow customers to provide information associated with an item (or items) to be purchased may be configured to request any combination of information. That is, at any time a single query message window may be provided by application 125 that allows a customer to enter in the purchase price of an item, the description of the item, or request an interactive calculation associated with their account. Also, a default window may be provided by application 125 when the customer first accesses a web site, wherein the default window may provide icons or selections associated with various types of messages to be displayed. That is, for example, an icon may be provided in the default window that is associated with the account status process describe din FIG. 6, while another icon may be provided that is associated with the interactive account status process described in FIG. 7. Therefore, application 125 may be configured to allow the customer to selectively choose which type of message to display dynamically, using a default interactive message window that includes selections for any combination of processes offered by application 125.

Additionally, methods and system consistent with the present invention may be implemented by a variety of financial institutions and organizations, and by the customers of these entities. The term "credit" may be associated with any type of financial account that individuals may utilize to purchase goods and/or services and is not intended to be limiting.

Furthermore, various processes performed by application 125 may be performed by credit issuer 150 and/or network server 140. For example, application 125 may be configured to only request and retrieve information from network server 140, while network server 140 performs the processes depicted in FIGS. 3-9. Alternatively, any combination of processes may be shared by application 125 and network server 140 to perform the functions consistent with features of the present invention.

Furthermore, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents

What is claimed is:

1. A method carried out at a system, the method comprising:
   accessing a web site provided by a web server;
   displaying a window including the web site provided by the web server;
   accessing, via an application associated with a financial account issuer, account information for a financial account provided by the financial account issuer and associated with the system;
   receiving, via the application, a list of one or more web sites, wherein the list includes, for each web site, a rating associated with a perceived quality of the web site;
   displaying at least one of:
      a first discount message reflecting a discount for a first item offered by the accessed web site contingent on the user purchasing the first item using the financial account; or
      a second discount message reflecting a discount for a second item offered by an alternate web site in the list contingent on the user purchasing the second item using the financial account;

in response to accessing the account information, determining, via the application, that the web site provided by the web server is included in the list and retrieving the rating associated with the web site from the list; and presenting a message that includes the rating of the accessed web site, wherein the message is displayed in the window.

2. The method of claim 1, wherein the list is provided by the financial account issuer.

3. The method of claim 2, wherein the steps of determining that the web site provided by the web server is included in the list, retrieving the rating associated with the web site from the list, and presenting the message are performed without intervention from the financial account issuer.

4. The method of claim 3, further comprising:
presenting a request to a user of the system to rate the web site.

5. The method of claim 4, further comprising:
providing the user rating to the financial account issuer; and
updating the rating of the web site based on the user rating.

6. The method of claim 3, wherein the message is one of a rolling ticker message and a pop up window.

7. A non-transitory computer-readable medium including instructions for performing system operations when executed by a processor, the system operations comprising:
accessing a web site provided by a web server;
displaying a window including the web site provided by the web server;
accessing, via an application associated with a financial account issuer, account information for a financial account provided by the financial account issuer and associated with the system;
displaying at least one of:
a first discount message reflecting a discount for a first item offered by the accessed web site contingent on the user purchasing the first item using the financial account; or
a second discount message reflecting a discount for a second item offered by an alternate web site in the list contingent on the user purchasing the second item using the financial account;
receiving, via the application, a list of one or more web sites, wherein the list includes, for each web site, a rating associated with a perceived quality of the respective web site;
in response to accessing the account information, determining, via the application, that the web site provided by the web server is included in the list and retrieving the rating associated with the web site from the list; and
presenting a message that includes the rating of the accessed web site, wherein the message is displayed in the window.

8. The non-transitory computer-readable medium of claim 7, wherein the list is provided by-the financial account issuer.

9. The non-transitory computer-readable medium of claim 8, wherein the steps of determining that the web site provided by the web server is included in the list, retrieving the rating associated with the web site from the list, and presenting the message are performed without intervention from the financial account issuer.

10. The non-transitory computer-readable medium of claim 9, further comprising:
presenting a request to a user of the system to rate the web site.

11. The non-transitory computer-readable medium of claim 10, further comprising:
providing the user rating to the financial account issuer; and
updating the rating of the web site based on the user rating.

12. The non-transitory computer-readable medium of claim 9, wherein the message is one of a rolling ticker message and a pop up window.

13. A system comprising:
a display;
a memory storing instructions; and
at least one processor configured to execute the instructions to perform operations comprising:
accessing, via a browser software configured to communicate with a web server, a web site provided by the web server;
displaying, via the display, a window including the web site provided by the web server;
accessing, via an application associated with a financial account issuer, account information for a financial account provided by the financial account issuer and associated with the system;
receiving, via the application, a list of one or more web sites, wherein the list includes, for each web site, a rating associated with a perceived quality of the web site;
displaying at least one of:
a first discount message reflecting a discount for a first item offered by the accessed web site contingent on the user purchasing the first item using the financial account; or
a second discount message reflecting a discount for a second item offered by an alternate web site in the list contingent on the user purchasing the second item using the financial account;
in response to accessing the account information, determining, via the application, that the web site provided by the web server is included in the list and retrieving the rating associated with the web site from the list; and
presenting, via the display, a message that includes the rating of the accessed web site, wherein the message is displayed in the window.

14. The system of claim 13, wherein the list is provided by the financial account issuer.

15. The system of claim 14, wherein the steps of determining that the web site provided by the web server is included in the list, retrieving the rating associated with the web site from the list, and presenting the message are performed without intervention from the financial account issuer.

16. The system of claim 15, the operations further comprising:
presenting, via the display, a request to a user of the system to rate the web site.

17. The system of claim 16, further comprising:
providing the user rating to the financial account issuer; and
updating the rating of the web site based on the user rating.

18. The system of claim 15, wherein the message is one of a rolling ticker message and a pop up window.

* * * * *